United States Patent [19]
Fanshier et al.

[11] Patent Number: 5,751,962
[45] Date of Patent: May 12, 1998

[54] OBJECT-BASED SYSTEMS MANAGEMENT OF COMPUTER NETWORKS

[75] Inventors: Stephen Reid Fanshier; My Tien Pare, both of San Diego; Anthony Bautista Nacional, Oceanside; Steven Lynn Klekas, Poway, all of Calif.

[73] Assignee: NCR Corporation, Dayton, Ohio

[21] Appl. No.: 572,251

[22] Filed: Dec. 13, 1995

[51] Int. Cl.$^6$ .................................................. G06F 15/16
[52] U.S. Cl. .................. 395/200.53; 395/200.54; 395/683; 345/969
[58] Field of Search .......................... 395/349, 969, 395/970, 356, 966, 329, 200.03, 200.09, 200.1, 200.11, 909, 917, 200.54, 200.53, 200.47, 200.31, 200.5, 200.49, 683; 364/514 B, 514 C; 345/349, 969, 970, 356, 966, 329

[56] References Cited

U.S. PATENT DOCUMENTS

| | | | |
|---|---|---|---|
| 5,276,789 | 1/1994 | Besaw et al. | 345/969 X |
| 5,295,244 | 3/1994 | Dev et al. | 395/200.53 X |
| 5,394,522 | 2/1995 | Sanchez-Frank et al. | 345/349 |
| 5,471,399 | 11/1995 | Tanaka et al. | 345/969 X |
| 5,483,631 | 1/1996 | Nagai et al. | 395/200.54 X |
| 5,586,255 | 12/1996 | Tanaka et al. | 395/200.53 |
| 5,627,766 | 5/1997 | Beaver | 395/200.54 X |
| 5,655,081 | 8/1997 | Bonnell et al. | 395/200.53 X |

*Primary Examiner*—Raymond J. Bayerl
*Attorney, Agent, or Firm*—Merchant, Gould, Smith, Edell, Welter & Schmidt

[57] ABSTRACT

A method, apparatus, and article of manufacture for object-based systems management of a computer network. An object-based representation of the network is stored in a memory of a computer. The object-based representation includes one or more objects linked together in the memory to form a hierarchy, wherein each of the objects represents the network, one or more nodes within the network, or one or more components executed by each of the nodes within the network. Each of the objects stores systems management information about the network, node, or component. A systems management application performed by the computer retrieves information from the network, nodes, and components, and stores the retrieved information in the objects.

51 Claims, 6 Drawing Sheets

OBJECT-BASED SYSTEMS MANAGEMENT OF COMPUTER NETWORKS

CROSS-REFERENCE TO RELATED APPLICATIONS

This application is related to Application Ser. No. 08/571,499, entitled "APPLICATIONS PROGRAMMING INTERFACE FOR OBJECT-BASED SYSTEMS MANAGEMENT OF COMPUTER NETWORKS," filed on same date herewith, by Stephen Fanshier et al., which application is incorporated by reference herein.

BACKGROUND OF THE INVENTION

1. Field of the Invention

This invention relates in general to computer networks, and in particular to a method, apparatus, and article of manufacture for object-based systems management of computer networks.

2. Description of Related Art

An important trend in the industry is the development of client/server architectures in distributed computing environments to support transaction processing applications. Currently, distributed computing environments typically comprise interconnected mainframes, minicomputers, servers and workstations. This integration of mainframes, minicomputers, servers and workstations into a distributive computing environment creates the need for system management tools capable of operating in this environment.

SUMMARY OF THE INVENTION

The present invention discloses a method, apparatus, and article of manufacture for object-based systems management of a computer network. An object-based representation of the network is stored in a memory of a computer. The object-based representation comprises one or more objects linked together in the memory to form a hierarchy, wherein each of the objects represents the network, one or more nodes within the network, or one or more components executed by each of the nodes within the network. Each of the objects stores systems management information about the network, node, or component. A systems management application performed by the computer retrieves information from the network, nodes, and components, and stores the retrieved information in the objects.

An object of the present invention is to provide enhanced tools for systems management of computer networks. Yet another object of the present invention is to provide an improved method of storing information on the networks, nodes with the networks, and components executed by the nodes. Still another object of the present invention is to provide a method for customers and third party vendors to create their own systems administration utilities.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
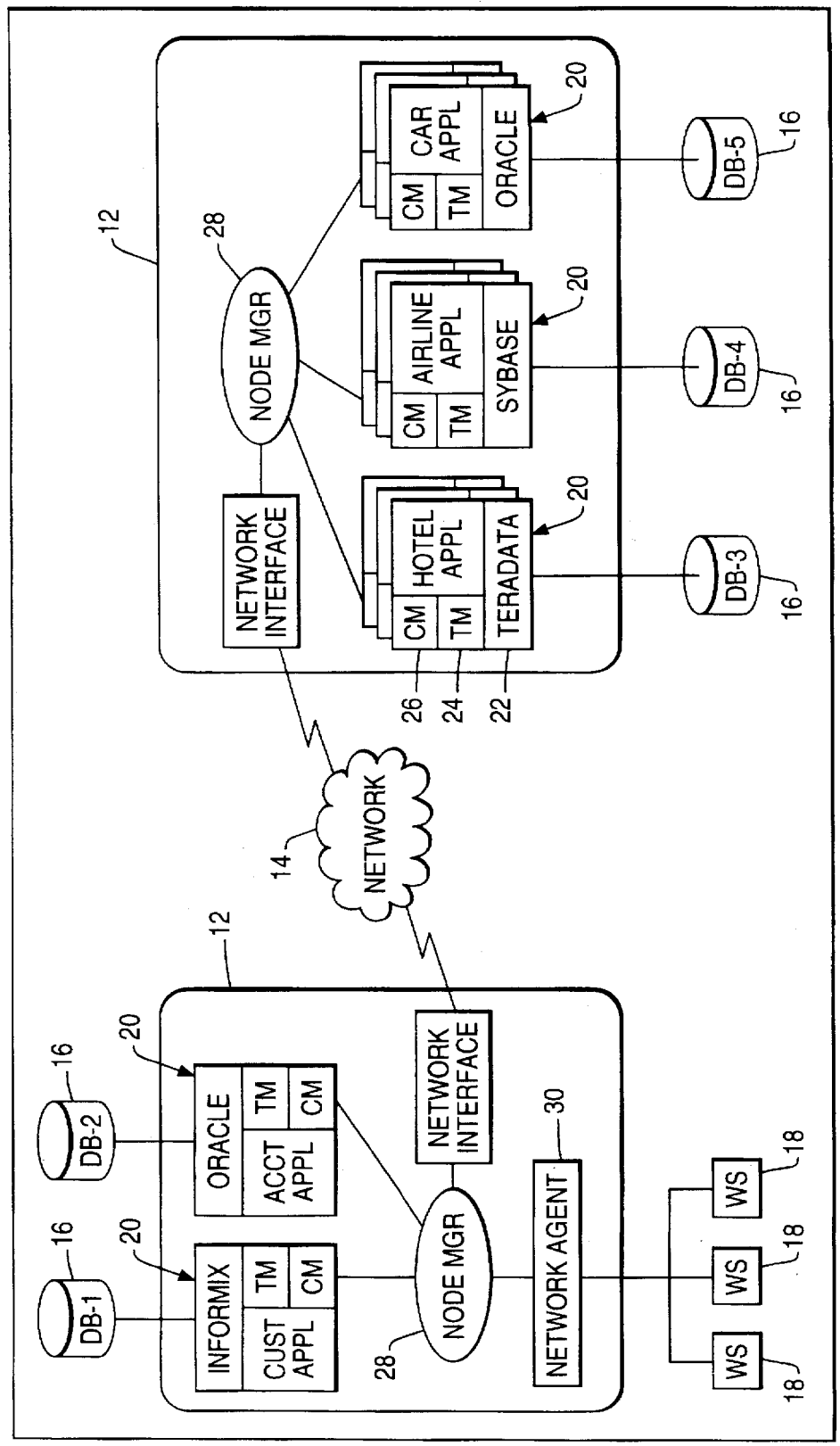
FIG. 1 is an exemplary illustration of a distributed computing environment known as a TOP END (tm) system.

FIG. 1 is an exemplary illustration of a distributed computing environment 10, known as a TOP END (tm) system. The present invention comprises a method, apparatus, and program product for facilitating the systems administration of such distributed computing environments.

A TOP END system 10 is comprised of one or more nodes 12 interconnected by a network 14, wherein each of the nodes 12 is comprised of one or more computers. Each of the nodes 12 is typically coupled to one or more fixed and/or removable data storage units (DSUs) 16, such as disk drives, that store one or more databases.

In the exemplary environment of FIG. 1, a client-server architecture is disclosed. At least one of the nodes 12 provide the connection to client systems operating on workstations 18. Operators of the TOP END system 10 use a workstation 18 or terminal to transmit electrical signals to and from server systems operating on the node 12 in the TOP END system 10, wherein the electrical signals represent commands for performing various functions in the TOP END system 10, such as search and retrieval functions against the databases. Those skilled in the art will recognize, however, that the present invention has application to any function or software that can be performed by a TOP END system 10.

According to the present invention, these functions are divided into several modular components 20 that are designed for a distributed, message-passing computing environment. In TOP END terminology, a "component" 20 is a process or logical group of processes that performs one or more functions. The components 20 work together to process distributed transactions initiated by the client systems.

Work is divided among the nodes 12 in the TOP END system 10 by spreading the location of these modular components across the nodes 12. Thus, each node 12 performs some localized function and work is managed by the system 10 so that a sequence of multiple functions comprising a client request is performed by one or more of the modular components on one or more of the nodes 12 in the system 10.

The fundamental component 20 in a TOP END system 10 is the application component 20. Application components 20 are used to create and grow distributed TOP END systems 10. The application components 20 could be user-written, provided as a solution by an independent vendor, or supplied as part of the TOP END system 10. In a TOP END system 10, a comprehensive set of services and libraries are available to an application component 20, including resource managers 22 such as database management systems (DBMS), transaction managers 24, communications managers 26.

Another component of a TOP END system 10 is the node manager 28. The node manager 28 is a collection of processes that offer core services to coordinate processing among nodes 12. These processes, in general, work independently of each other. Services provided by the node manager 28 include transaction management (for example, commit coordination), logging, failure recovery, client/server request handling, security management, runtime administration, and application component 20 control.

Still another component of a TOP END system 10 is the network agents 30. Network agents 30 are used to allow transactions and service requests to enter a TOP END system 10 from an application component 20 or networked workstation 18 that does not have a node manager 28 on it.

The TOP END system 10 also provides a myriad of tools for managing the distributed computing environment. More specifically, a TOP END system 10 provides a full range of graphical, menu-based administrative tools that make it easy to manage distributed computing environments. The systems administration tools are used to perform component start-up and shutdown, manage auditing and recovery, activate communication links, perform automatic software distribution, and so on.

For high availability reasons, there are two levels of administration provided: global and local. Global administration provides a single operational view of the TOP END system 10 allowing administrators to control all nodes 12 from a single workstation 18. For certain failure situations, however, local (or single node) systems administration can be used to accomplish controlled administration on a node-by-node basis.

In the prior art, management of TOP END systems 10 is handled by a small collection of administrative utilities. These utilities perform the basic administrative functions required by system administrators. Different customers have different requirements, however, which are not performed by the existing utilities. Thus, a need was seen to allow customers and third party vendors to create their own systems administration utilities for TOP END systems 10, customized to their needs.

Systems Management Application

Figure 2:
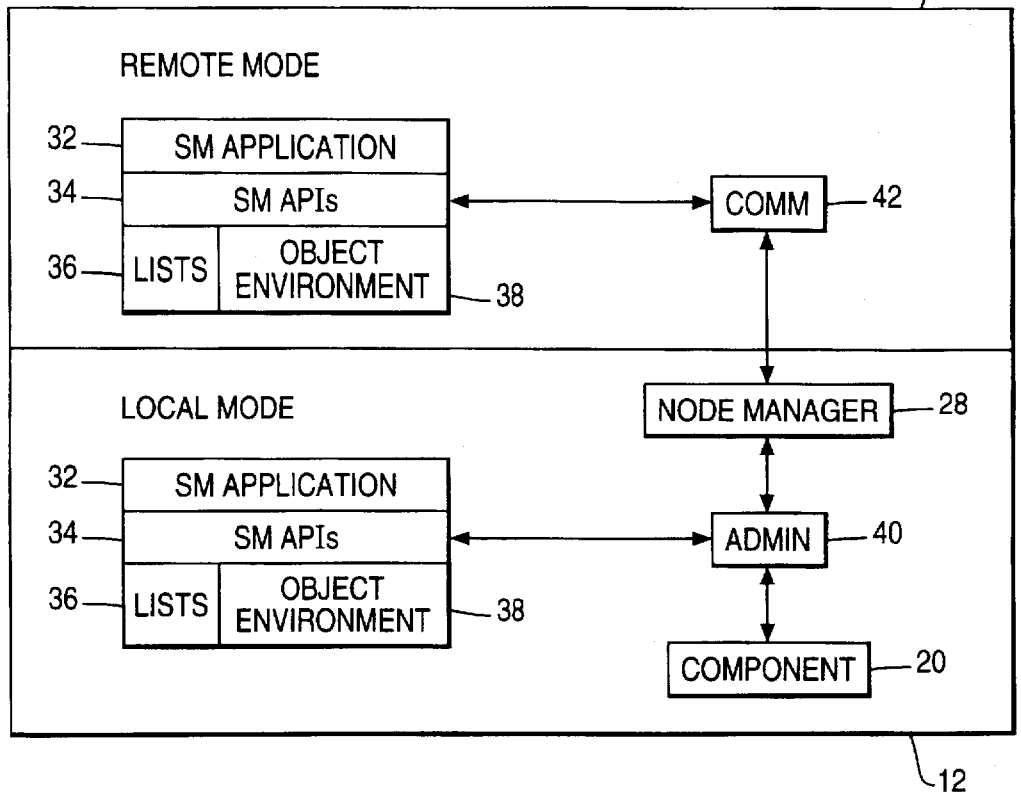
FIG. 2 is a block diagram that illustrates the structure of a systems management application according to the present invention.

FIG. 2 is a block diagram that illustrates the structure of a systems management (SM) application 32 according to the present invention. The present invention provides an object-based systems management environment that allows the SM application 32 to manage one or more TOP END systems 10, nodes 12, and components 20.

The SM application 32 is one or more object programs that are linked or bound to one or more object libraries known as an SM Applications Programming Interface (API) 34. The SM API 34 provides the functions necessary for the desired systems administration. The SM application 32 and SM API 34 are executed by a computer under the control of an operating system, such as Windows NT™, UNIX™, etc. The computer may be a workstation 18 or a node 12 connected to the network 10.

Generally, the SM application 32 and SM API 34 are all tangibly embodied in a computer-readable medium, e.g., one or more of the fixed and/or removable data storage devices 16 coupled to the computer 12 or 18. Moreover, the SM application 32 and SM API 34 are both comprised of instructions which, when read and executed by the computer 12 or 18, causes the computer 12 or 18 to perform the steps necessary to implement and/or use the present invention. Under control of the operating system, the SM application 32 and SM API 34 may be loaded from the data storage devices 16 into the memory of the computer 12 or 18 for use during actual operations.

The SM application 32 uses the SM API 34 to retrieve configuration data for TOP END systems 10, make requests to TOP END systems 10, nodes 12 and components 20, process responses from TOP END systems 10, nodes 12 and components 20, and process incoming alerts from TOP END systems 10, nodes 12 and components 20.

The SM API 34 manipulates lists 36 and an object environment 38 in performing the systems management functions. The SM API 34 also uses the existing transport mechanism of TOP END systems 10 for communicating administrative requests and responses between SM applications 32 and nodes 12 and components 20 in TOP END systems 10.

As shown in FIG. 2, the SM application 32 may be executed in either a local or a remote mode of operation. In the local mode, the SM application 32 makes requests directly to an ADMIN process 40. The ADMIN process 40 is responsible for forwarding administrative requests to the desired TOP END nodes 12 and components 20 and for returning responses to the requesting SM application 32.

In the remote mode, the SM application 32 makes requests to a communications or transport process 42, which forwards the requests to an ADMIN process 40 on the appropriate node 12 in the TOP END system 10. The ADMIN process 40 then performs the desired function, transmits it to another component 20 on the node 12 or another node 12, and also forwards responses back to the SM application 32 via the communications process. The default mode of operation will be "remote" if the SM application 32 is running from an administrative node 12 and "local" otherwise.

The SM application 32 is intended as a long-running program which maintains a complete object environment, accurately representing one or more TOP END systems 10. This application 32 may provide a graphical interface or be an agent which gathers information for a higher level management application. Having the management environment readily available allows such an application 32 to present the user with the current environment on multiple TOP END systems 10 across multiple nodes 12.

Object Environment

Figure 3:
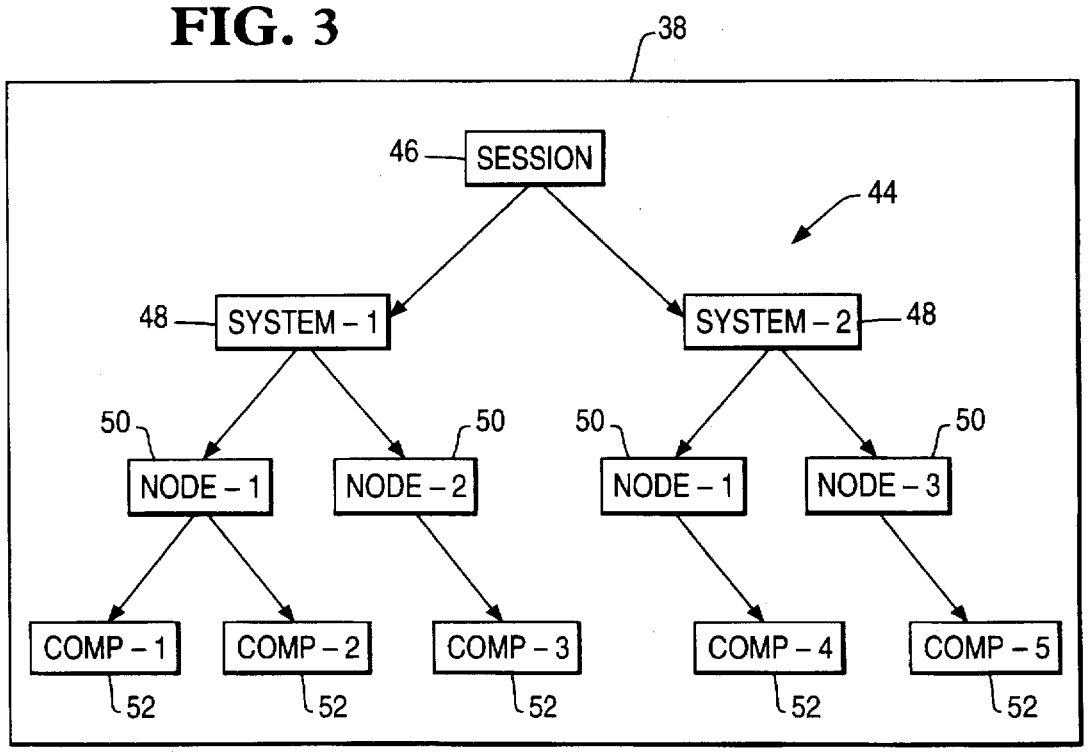
FIG. 3 is a block diagram that illustrates the object environment used for maintaining a description of the operations of one or more TOP END systems according to the present invention.

FIG. 3 is a block diagram that illustrates the object environment 38 used for maintaining a description of the operations of one or more TOP END systems 10 according to the present invention. The object environment 38 is an object-based data representation of the TOP END systems 10 stored in the memory of the computer 12 or 18 executing the SM application 32. The "objects" in the object environment 38 represent TOP END systems 10, nodes 12, and components 20. These objects are created and linked together in the memory to form a session hierarchy 44.

A session object 46 resides at the apex of the session hierarchy 44. Attributes of the session object 46 describe the options the SM application 32 is running with, in addition to information on the location of essential information for the SM application 32 and the SM API 34. An SM application 32 has exactly one session object 46, and a session object 46 is basically a collection of system objects 48.

Each system object 48 describes and represents the status of different TOP END systems 10. All system objects 48 are defined to be subordinate to the session object 46. System objects 48 are collections of node objects 50.

Each node object 50 describes the status of a node 12 associated with a TOP END system 10. All node objects 50 are defined to be subordinate to system objects 48. Node objects 50 are collections of component objects 52.

Each component object 52 describes an active component 20 on a node 12. All component objects 52 are defined to be subordinate to node objects 50.

In the example of FIG. 3, the session hierarchy 44 includes a session object 46 that is superior to two system objects 48, each of which is superior to two node objects 50. Note that one of the node objects 50, labeled as node-1, is subordinate to both system objects 48. This is possible since a node 12 can belong to multiple TOP END systems 10. The node object 50 labeled as node-1 has two subordinate component objects 52, while the other node objects 50 only have one component object 52 each.

Each object 46, 48, 50, and 52 is defined to have a set of attributes, services, and relationships with other objects 46, 48, 50, or 52. Attributes include the name, state, and connection status of the object 46, 48, 50, or 52. Services are functions or services provided by the SM API 34 for manipulating objects 46, 48, 50, or 52, such as creation, initialization, reading/writing attributes, and deletion of objects 46, 48, 50, or 52. Relationships between objects 46, 48, 50, or 52 are defined by their interconnections in the session hierarchy 44.

Each of the objects 46, 48, 50, or 52 stores sufficient information, in the form of attributes, to identify the object 46, 48, 50, or 52, and to provide the SM application 32 with management information about the object 46, 48, 50, or 52 and its associated TOP END system 10, node 12, and component 20. Each system object 48, node object 50, and component object 52, for example, would contain the name of the associated system 10, node 12, or component 20, as well as current monitoring status, error log information, alert severity level, location of key files, and a list of processing elements.

Figure 4:
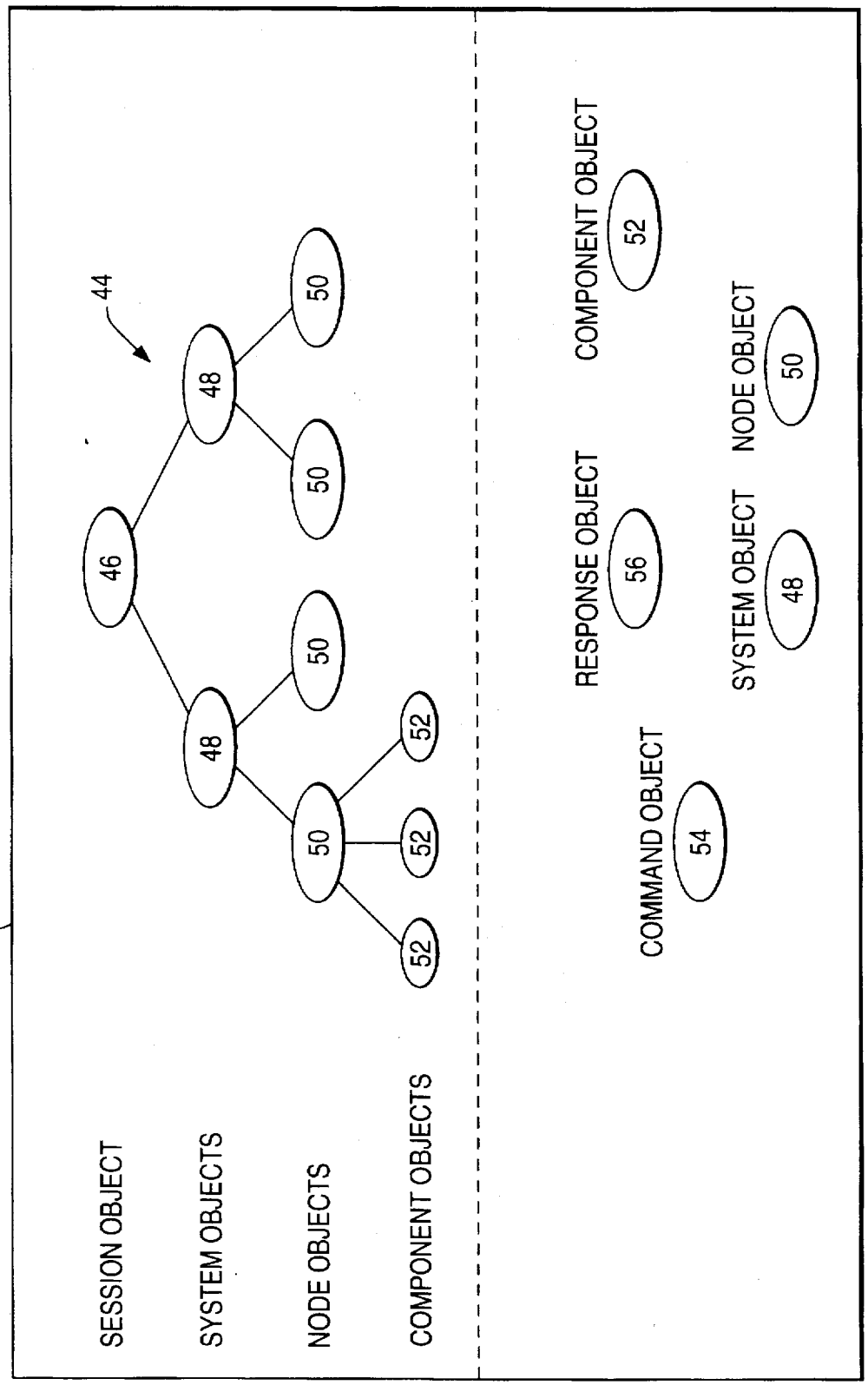
FIG. 4 is a block diagram that also illustrates the object environment used for describing the TOP END system according to the present invention.

FIG. 4 is a block diagram that also illustrates the object environment 38 used for describing the TOP END system 10 according to the present invention. In this illustration, there are also a number of objects outside the session hierarchy 44, including command objects 54 and response objects 56. In addition, as shown in FIG. 4, there may be system objects 48, node objects 50, and component objects 52 outside the session hierarchy 44.

Command objects 54 and response objects 56 do not occupy a place in the session hierarchy 44, but are part of the object environment 38. They are used by the SM application 32 to send and to receive messages to and from objects 48, 50, or 52 in the session hierarchy 44.

The command object 54 describes a systems administrative request targeting a system 10, node 12 or component 20. The supported functions include, but are not limited to, signing on and off systems 10 and nodes 12, plus systems administrative functions including startup, shutdown, status, messages, connections, configurations, controls, and diagnostics. Command objects 54 can be set up to target any of the objects 48, 50, or 52 in the hierarchy 44, and their associated system 10, node 12 or component 20. When sent to that object 48, 50, or 52, the information from the command object 54 is transmitted to the actual system 10, node 12, or component 20 associated with the object 48, 50, or 52, where it is processed by the appropriate processing element, such as an ADMIN process 40 on the node 12 or a specific component 20 on the node 12, depending on the type of request.

The response object 56 stores the response received from a system 10, node 12, or component 20 targeted by a command object 54. These responses include those from explicit requests made via command objects 54 and unsolicited messages from the system 10, node 12, or component 20. Unsolicited messages can be either updates to the status of the system 10, node 12, or component 20, or alert messages received from systems 10, nodes 12, or components 20.

Object Data Structures

Figure 5:
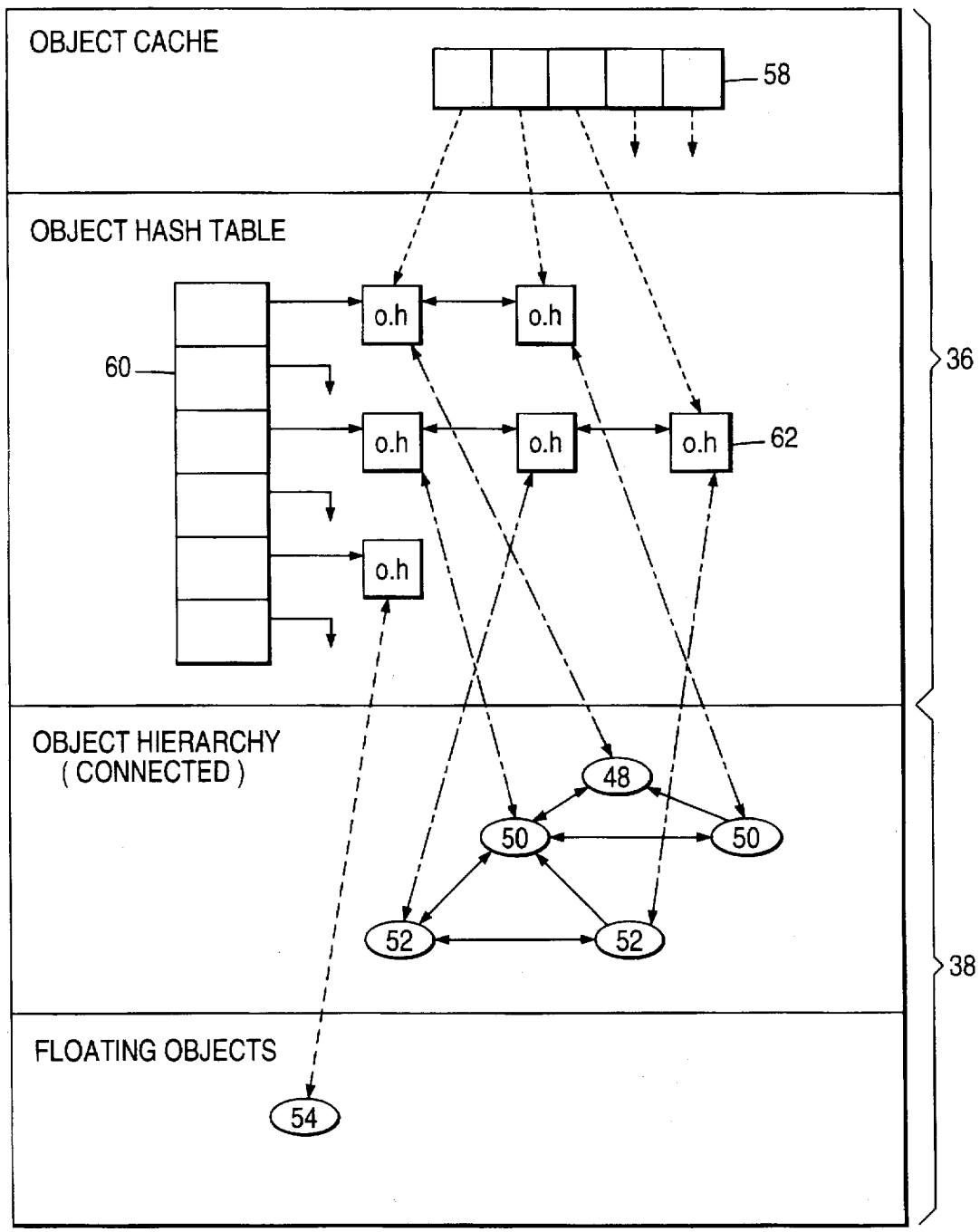
FIG. 5 comprises a block diagram that illustrates the data structures in the memory of the computer that are used by the SM application to perform the internal management of the object environment.

FIG. 5 comprises a block diagram that illustrates the data structures in the memory of the computer 12 or 18 that are used by the SM application 32 to perform the internal management of the object environment 38. The data structures comprise one or more object caches 58, one or more object hash tables 60, and the objects 62 themselves.

Each object 62 is assigned a unique identifier and is pointed to by an object head 64. The object head 64 contains information about the object 62 such as its identifier, type and address. The object heads 64 are managed by the object cache 58 and object hash tables 60.

In the preferred embodiment of the present invention, there are two object hash tables 60, also known as COMPTABLE and COMBOTABLE. Both tables 60 are arrays of pointers to lists of object heads 64. The only difference between the two tables 60 is the type of objects 62 they manage.

The COMPTABLE object hash table 60 manages object heads 64 associated with component objects 62 (connected and floating); the COMBOTABLE object hash table 60 manages object heads 64 associated with system, node, and command objects 62 (connected and floating). All created objects 62, floating and connected, can be accessed through the object hash tables 60.

A linear hashing technique is used to implement the object hash tables 60. The identifier of the object head 64 is used to hash into the table 60 to locate the row where it can be found or where it should be inserted. The relevant hash table 60 is determined by the object type. The linear hashing technique generates the index from the object identifier modulo the table size, which is a prime number. As an example, a component object head 64 with an identifier of 5 and an object hash table 60 with a size of 11 will hash to row 5 in the COMPTABLE object hash table 60, i.e., 5 modulo 11. The object head 64 is added to the list of object heads 64 pointed to by row 5 in the COMPTABLE object hash table 60. Subsequent component object heads 64 hashing to row 5 in the COMPTABLE object hash table 60 are also added to the list of object heads 64 referenced by this row. The list items are inserted in increasing order based on identifiers. All hash tables 60 have TABLE_SIZE rows.

Like the object hash tables 60, the object cache 58 is an array of CACHE_SIZE pointers to object heads 64. The object cache 58 is designed to reference the most recently accessed objects 62 when inserting or searching object heads 64 in the object hash tables 60.

Systems Management Logic

Figure 6A:
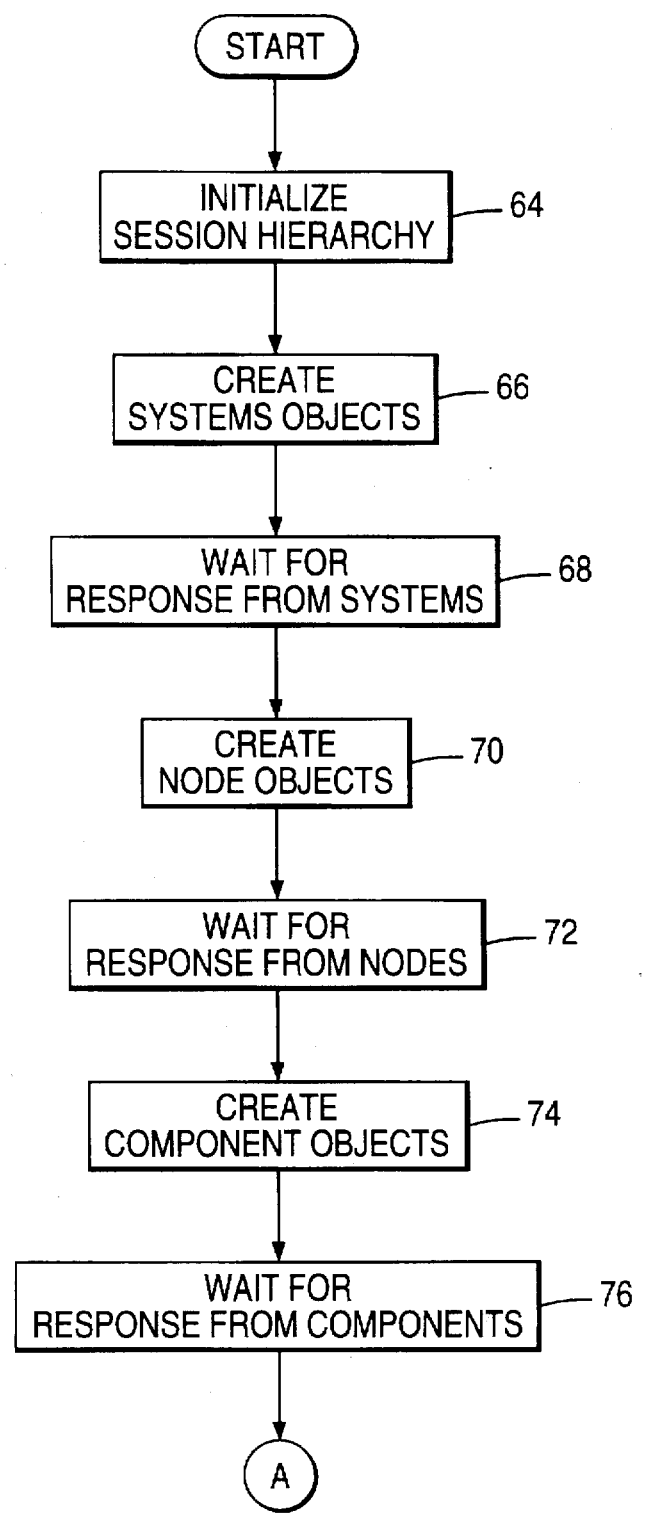
FIGS. 6A and 6B together are a flowchart that further describes the processing of the systems management application using the systems management application programming interface to manage a TOP END system.
Figure 6B:
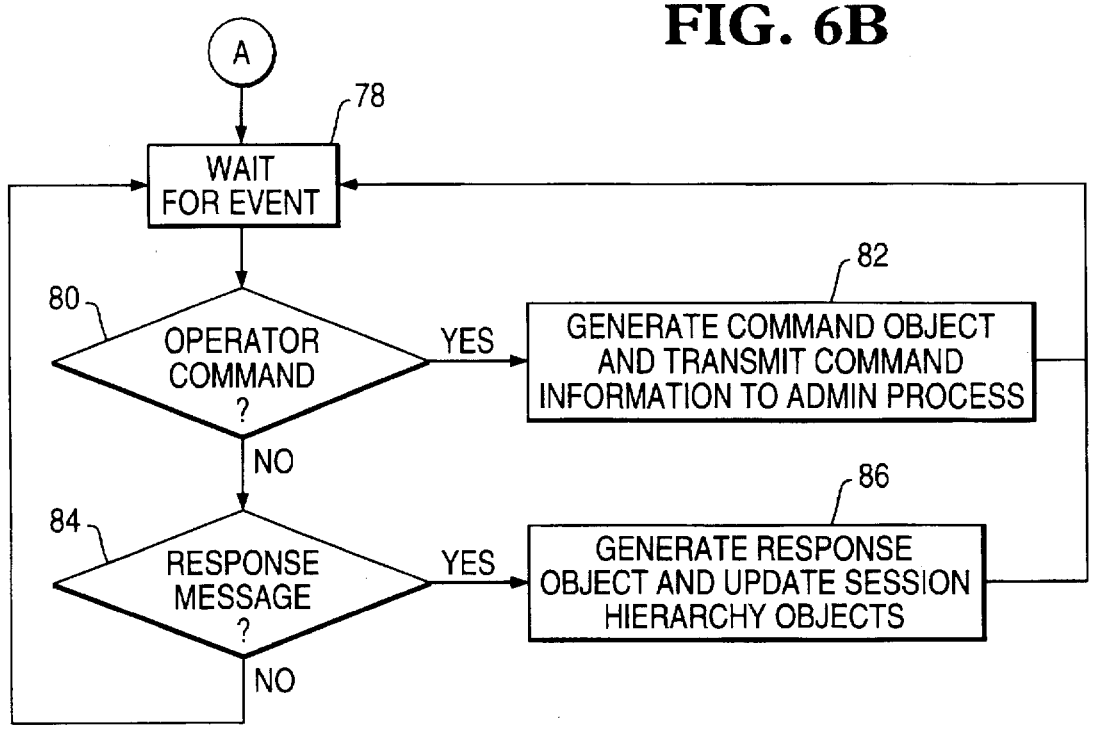

FIGS. 6A and 6B together are a flowchart that further describes the processing of the SM application 32 using the SM API 34 to manage a TOP END system 10. FIG. 6A is a flowchart that represents the initialization phase of the SM application 32.

Block 64 represents the SM application 32 initializing the session hierarchy 44 before performing any other tasks involving the SM API 34 and the TOP END system 10. This is done by creating the session object 46, and then optionally modifying the attributes of the session object 46.

Block 66 represents the SM application 32, after the session object 46 has been created, creating one or more system objects 48, and inserting the system objects 50 into the session hierarchy 44. Block 66 also represents the SM application signing onto the associated TOP END systems 10 represented by the system objects 48.

Block 68 represents the SM application 32, after sending the sign-on requests, waiting for a response from the associated TOP END system 10. Once the sign-on response is received from the TOP END system 10, block 68 also represents the SM application 32 applying the data contained within the response to the associated system object 48 in the object environment 38. This ensures that the system object 48 in the object environment 38 reflects the state of the associated TOP END system 10.

Block 70 represents the SM application 32, after initializing the system objects 48, creating node objects 50 for all known nodes 12 in the TOP END systems 10, and inserting the node objects 50 into the session hierarchy 44. For each node object 50, its sign-on state is checked by the SM application 32, and if signed off, block 70 also represents a sign-on attempt being made by the SM application 32.

Block 72 represents the SM application 32, after sending the sign-on request, waiting for a response from the associated node 12. Once the sign-on response is received from the node 12, block 72 also represents the SM application 32 applying the data contained within the response to the associated node object 50 in the object environment 38. This ensures that the node object 48 in the object environment 38 reflects the state of the associated node 12.

Block 74 represents the SM application 32, after initializing the node objects 50, creating component objects 52 for all known components 20 in each node 12 in the TOP END systems 10, and inserting the component objects 52 in the session hierarchy 44. For each component object 52, its sign-on state is checked by the SM application 32, and if signed off, block 74 represents a sign-on attempt being made by the SM application 32.

Block 76 represents the SM application 32, after sending the sign-on request, waiting for a response from the associated component 20. Once the sign-on response is received from the component 20, block 76 also represents the SM application 32 applying the data contained within the response to the associated component object 52 in the object environment 38. This ensures that the component object 52 in the object environment 38 reflects the state of the associated component 20.

In the session hierarchy 44, component objects 52 represent actively running application components 20, or place holders for future components 20, or terminated components 20. Whether the component 20 is active or not can be determined by inspecting the status attribute of its associated component object 52. This attribute is updated when status responses received from each node 12 and component 20 are used to update the object environment 38.

If the component 20 is included in a node 12 status or sign-on response, its state will be set to active in the component object 52. If it is not in one of these responses, its state will be set to inactive in the component object 52. A component 20 status response will also create and/or update the state of a component object 50 as necessary.

The state of a component object 52 can also be unknown indicating that it is not subordinate to a signed-on node object 50 or that it identifies a startable script for the associated component 20. Whether a component 20 is active or not makes no difference when the component object 52 is a target for a request.

Following block 76, control is transferred to block 78 in FIG. 6B. FIG. 6B is a flowchart that represents the command and response processing phase of the SM application 32. Block 78 represents the SM application 32 waiting for the next event, either operator input or a response from a prior command object 54.

Block 80 is a decision block that represents the SM application 32 determining whether the input is an operator command. If so, control transfers to block 82; otherwise, control transfers to block 84. Block 82 represents the SM application 32 generating a command object 54 and sending the command information stored in the command object 54 to the ADMIN process 40 for subsequent transmission to the targeted components 20, nodes 12, and/or TOP END systems 10. A command object 54 is used to specify an administrative request made by the SM application 32 and to specify the target of that request, i.e., one or more TOP END systems 10, one or more nodes 12 within the system 10, and/or one or more components 20 executed on the nodes 12 within the system 10.

If one or more system objects 48 are used as targets for the command object 54, then the effective targets would be all active component objects 52 on all signed on node objects 50 that are subordinate to the targeted system objects 48. Similarly, if one or more node objects 50 are used as targets for command objects 54, then the effective target would be all active component objects 52 that are subordinate to the targeted node objects 50. Finally, if one or more component objects 52 are used as targets for the command object 54, then the effective target would be the identified component objects 52. In all of the above cases, if multiple instances of system objects 48, node objects 50, or component objects 52 are targeted, then multiple messages are sent to the ADMIN processes 40 for subsequent transmission to the associated TOP END systems 10, nodes 12, and/or components 20.

The identifying attributes of an object 48, 50, or 52 are its type, name, and number. The SM application 32 uses these attributes to identify the targets of command objects 54. Any of these attributes may be omitted or set to a default value when identifying the target of a command object 54. The effect will be that the attributes set to default values are not used to identify potential targets for the command objects 54 and all component objects 52 that match the other specified attributes are targeted by the command object 54. Not specifying certain identifying attributes in this manner is known as "wildcarding".

Block 84 is a decision block that represents the SM application 32 determining whether the input is a response message. If so, control transfers to block 86; otherwise, control transfers to block 78. Block 86 represents the SM application 32 generating a response object 56 and then updating the objects 52, 50, or 48 in the session hierarchy 44 with the response information from the targeted components 20, nodes 12, and/or systems 10, respectively.

Figure 7:
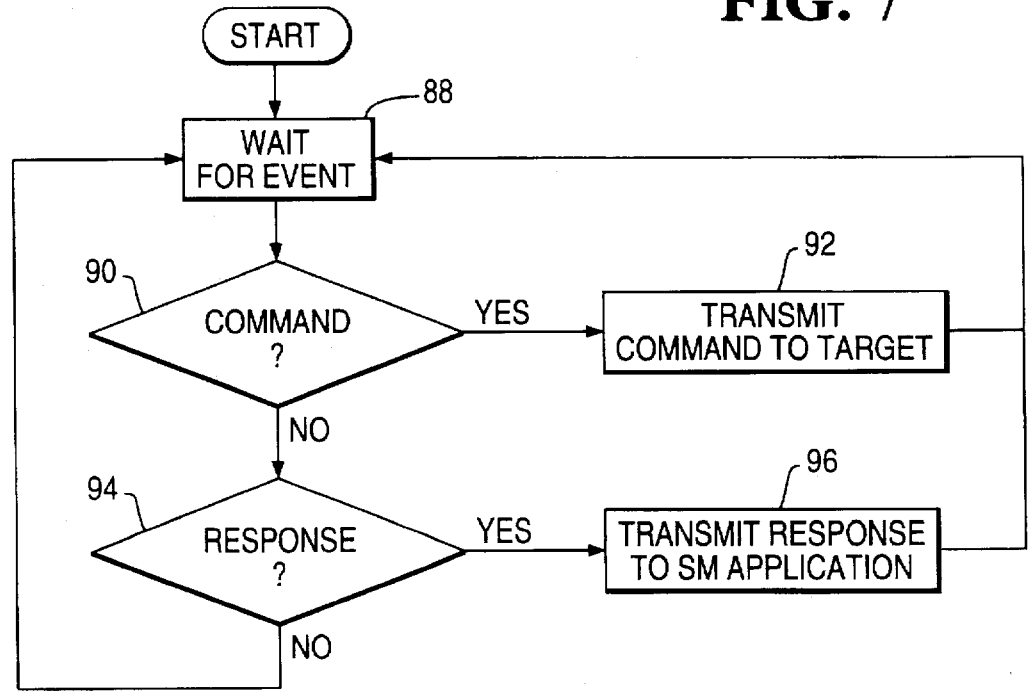
FIG. 7 is a flowchart that represents the command and response processing phase of the ADMIN process.

FIG. 7 is a flowchart that represents the command and response processing phase of the ADMIN process 40. Block 88 represents the ADMIN process 40 waiting for the next event, either a command from the SM application 32 or a response from a targeted TOP END system 10, node 12, and/or component 20 to a prior command transmitted by the ADMIN process 40.

Block 90 is a decision block that represents the ADMIN process 40 determining whether the input is a command from the SM application 32. If so, control transfers to block 92; otherwise, control transfers to block 94. Block 92 represents the ADMIN process 40 translating the command information into the appropriate message, locating the targeted systems 10, nodes 12, and/or components 20, and transmitting the message to the targeted components 20, nodes 12, and/or systems 10.

The success of a command depends on a number of factors:

Transport of the command information to the targeted system 10, node 12, and/or component 20;

Recognition of the command information by targeted systems 10, nodes 12, and components 20;

Receiving responses from the targeted systems 10, nodes 12, and/or components 20; and Transport of responses back to the SM application 32.

Block 92 also represents the ADMIN process 40 transmitting an initial acknowledgement of the command information back to the SM application 32.

Block 94 is a decision block that represents the ADMIN process 40 determining whether the input is a response from a targeted system 10, node 12, and/or component to the prior transmitted command or an unsolicited message. If so, control transfers to block 96; otherwise, control transfers to block 88. Block 96 represents the ADMIN process 40 transmitting the response information back to the SM application 32. In general, the ADMIN process 40 can expect one acknowledgement and zero or more additional responses from each node 12 receiving the prior command. Note that if a system 10 or node 12 or multiple component 20 comprise the target, then there will be multiple sets of responses returned to the ADMIN process 40.

The following commands return additional responses:

node 12 status;

remote node 12 sign-on; and component 20 status.

Since commands and responses involve inter-process and possibly inter-node communications, there are many reasons why a command may not be received by its target and a response may not be received by the ADMIN process 40. Additionally, TOP END systems 10, nodes 12, and components 20 are not required to respond to administrative requests. Therefore, not receiving a response to a command should not necessarily be construed as a failed command.

The ADMIN process 40 may also receive a number of unsolicited messages from TOP END systems 10, nodes 12, and components 20. These include unsolicited status messages and alert messages. Generally, these unsolicited status messages and alert messages are sent to the ADMIN process 40 as TOP END systems 10, nodes 12, and components 20 startup and shutdown. This allows the ADMIN process 40, and the SM application 32, to maintain an accurate view of the administrative domain without having to poll the TOP END systems 10, nodes 12, and components 20.

Systems Management Application Programming Interface

The SM API 34 provides the necessary procedures for the SM application 32 to successfully manage the object environment 38, and the TOP END systems 10, nodes 12, and components 20.

Key capabilities of the SM API 34 are listed below:

Supports concurrent management of multiple TOP END systems 10;

Supports concurrent management for all nodes 12 in a TOP END system 10;

Provides access to all active components 20 executed by nodes 12 of managed TOP END systems 10;

Provides transport of administrative requests to nodes 12 and components 20 in a TOP END system 10;

Manages responses to administrative requests;

Reporting of error conditions in a TOP END system 10;

Provides up to date status of all nodes 12 and components 20 in a TOP END system 10;

Supports centralized access to the entire TOP END system 10 or any partition of that system 10.

The following describe some the procedures of the SM API 34 invoked by the SM application 32:

The ATTACH-OBJECT function links a child object to a parent object constrained by the session hierarchy 44. As a result, the parent object needs to be of type class one higher in the session hierarchy 44 than the child class.

The COPY-OBJECT function makes a copy of an object and returns the identifier of the new object. The new object has the same attribute values as the object it was copied from, except that the state attribute is set to sign-off (for system objects 48 and node objects 50) or unknown (for component objects 52). Session objects 46 may not be copied. Further, the function can attach the new object of the same parent object of the original object.

The CREATE-OBJECT function creates a specific object and sets its known attributes. The identifier for the created object is returned as a handle for future reference to the object.

The DELETE-OBJECT function deletes the specified object, its referenced resources, such as files or buffers, its children objects, and any references to the object. In this manner, object deletion is recursive, so that if an object has children objects and references thereto, those objects and references are deleted. For example, a command object 54 has as its target attribute the identifier of an object, and therefore, the command object 54 references a target object. If the target object is deleted, then the command objects 54 referenced to the target object are also deleted. If the object is a session object 46, then all objects, including those not in the session hierarchy 44, are deleted. If the object is a system object 48 or a node object 50, then the object is signed-off if it is signed-on.

The GET-ATTRIBUTE function retrieves the value of a specified attribute from a specified object. The value of the attribute is returned as a parameter to the function.

The GET-CHILDREN function returns a list of immediate subordinate objects, by their identifier, for any objects specified in the function.

The GET-OBJECT LIST function returns a list of object identifiers that match the attribute and value pairs specified in a search criteria list. The search traverses the object environment 38 to find all objects that match the criteria. The search begins with the children of the specified object, or if no object is specified, then the entire object environment 38 is searched including objects that are not subordinate to the session object.

The GET-PARENT function returns the object identifier for the parent object of the object specified in the function parameter.

The INIT-OBJECT function initializes the object specified in the identifier and builds or updates its children objects that are one level down, but does not recursively process further through the session hierarchy 44. In the function, some attributes for the object are updated according to configuration and then, depending on the object type, configuration information is gathered to determine the children objects that should exist. Obsolete children objects are deleted, new children objects are built, and current children objects are updated.

The RECEIVE-RESPONSE function returns a system management response object 56. There are four response types: acknowledgement, buffer, file and alert. An acknowledgement response is promised to be returned for each command request sent to a node 12. The acknowledgment response will have one of the following results: the command request was accepted, unable to process the request, the connection to the node 12 was lost, unable to transfer file response data, the request timed out waiting for components 20 to respond, the ADMIN process 40 that routes request to components 20 could not be started, either the system 10 or the node 12 for which the request is targeted is unknown, or the request is valid only for the nodes 12 sign-on request.

The REQUEST-COMMAND function makes a command request based on the information provided by the attributes of the command object 54 specified by the object identification. The attributes are set as desired within the command object 54 before invoking a function. A number of command requests are supported, including sign-on, sign-off, start-up, shut-down, node 12 status, component 20 status, diagnostics, message, configuration, connect network interface, disconnect network interface, and other messages.

The SET-ATTRIBUTE function sets the value of a specified attribute in a specified object to a specified value.

The SM-UPDATE function applies response data referenced by a response object 56 to the object environment 38. Objects within the environment 38 are modified, deleted or created as necessary. The DUMP-OBJECT function outputs object information and structure on one or more selected objects.

Conclusion

In summary, the present invention discloses a method, apparatus, and article of manufacture for object-based systems management of a computer network. An object-based representation of the network is stored in a memory of a computer. The object-based representation comprises one or more objects linked together in the memory to form a hierarchy, wherein each of the objects represents the network, one or more nodes within the network, or one or more components executed by each of the nodes within the network. Each of the objects stores systems management information about the network, node, or component. A systems management application performed by the computer retrieves information from the network, nodes, and components, and stores the retrieved information in the objects.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A systems administration apparatus for a computer network, comprising:
   (a) a computer having a memory, the computer being connected to a network;
   (b) an object-based representation of the network stored in the memory of the computer, wherein the object-based representation comprises one or more objects linked together in the memory to form a hierarchy, wherein each of the objects represents the network, one or more nodes within the network, or one or more components executed by each of the nodes within the network, and wherein each of the objects stores systems management information about the network, node, or component; and
   (c) systems management means, performed by the computer, for generating command objects that target any of the objects in the hierarchy, wherein the command objects describe a systems administrative request for the associated network, node, and component, and the systems administrative request is transmitted to the associated network, node, and component when the command object is sent to the targeted object.

2. The systems administration apparatus of claim 1, wherein the object-based representation further comprises a session object at an apex of the hierarchy.

3. The systems administration apparatus of claim 2, wherein the session object comprises a collection of system objects.

4. The systems administration apparatus of claim 3, wherein the system object describes and represents a network.

5. The systems administration apparatus of claim 4, wherein the node object describes and represents a node within a network.

6. The systems administration apparatus of claim 5, wherein the component object describes and represents a component executing on a node within a network.

7. The systems administration apparatus of claim 1, wherein each object is defined to have a set of attributes and relationships with other objects.

8. The systems administration apparatus of claim 1, wherein the systems administrative request is selected from a group comprising sign on, sign off, startup, shutdown, status, messages, connections, configurations, controls, and diagnostics.

9. The systems administration apparatus of claim 1, wherein the systems management means further comprises means for retrieving information from the networks, nodes, and components, and for storing the retrieved information in the objects in the memory of the computer.

10. The systems administration apparatus of claim 9, wherein the means for retrieving further comprises means for retrieving information from the networks, nodes, and components in response to the command objects.

11. The systems administration apparatus of claim 9, wherein the retrieved information comprises response objects.

12. The systems administration apparatus of claim 11, wherein the response objects are transmitted from targeted networks, nodes, and components in response to the command objects.

13. The systems administration apparatus of claim 11, wherein the response objects are transmitted from targeted networks, nodes, and components as unsolicited messages.

14. The systems administration apparatus of claim 1, wherein effective targets for the command object are all active component objects on all signed-on node objects that are subordinate to one or more network objects that are targets of the command object.

15. The systems administration apparatus of claim 1, wherein effective targets for the command object are all active component objects that are subordinate to one or more node objects that are targets of the command object.

16. The systems administration apparatus of claim 1, wherein effective targets for the command object are all component objects that are identified with one or more component objects that are targets of the command object.

17. The systems administration apparatus of claim 1, wherein the targets of the command objects are identified by one or more attributes selected from a group comprising type, name, and number.

18. A method of systems administration for a computer network, comprising the steps of:
   (a) creating an object-based representation of the network in a memory of a computer connected to the network, wherein the object-based representation comprises one or more objects linked together in the memory to form a hierarchy, wherein each of the objects represents the network, one or more nodes within the network, or one or more components executed by each of the nodes within the network, and wherein each of the objects stores systems management information about the network, node, or component;

(b) generating command objects that target any of the objects in the hierarchy, wherein the command objects describe a systems administrative request for the associated network, node, and component; and (c) transmitting the systems administrative request to the associated network, node, and component when the command object is sent to the targeted object.

19. The method of claim 18, wherein the object-based representation further comprises a session object at an apex of the hierarchy.

20. The method of claim 19, wherein the session object comprises a collection of system objects.

21. The method of claim 20, wherein the system object describes and represents a network.

22. The method of claim 21, wherein the node object describes and represents a node within a network.

23. The method of claim 22, wherein the component object describes and represents a component executing on a node within a network.

24. The method of claim 19, wherein the systems administrative request is selected from a group comprising sign on, sign off, startup, shutdown, status, messages, connections, configurations, controls, and diagnostics.

25. The method of claim 19, further comprising the step of retrieving information from the networks, nodes, and components, and for storing the retrieved information in the objects in the memory of the computer.

26. The method of claim 25, wherein the retrieving step further comprises the step of retrieving information from the networks, nodes, and components in response to the command objects.

27. The method of claim 25, wherein the retrieved information comprises response objects.

28. The method of claim 27, wherein the response objects are transmitted from targeted networks, nodes, and components in response to the command objects.

29. The method of claim 27, wherein the response objects are transmitted from targeted networks, nodes, and components as unsolicited messages.

30. The method of claim 18, wherein each object is defined to have a set of attributes and relationships with other objects.

31. The method of claim 18, wherein effective targets for the command object are all active component objects on all signed-on node objects that are subordinate to one or more network objects that are targets of the command object.

32. The method of claim 18, wherein effective targets for the command object are all active component objects that are subordinate to one or more node objects that are targets of the command object.

33. The method of claim 18, wherein effective targets for the command object are all component objects that are identified with one or more component objects that are targets of the command object.

34. The method of claim 18, wherein the targets of the command objects are identified by one or more attributes selected from a group comprising type, name, and number.

35. A program storage device, readable by a computer, tangibly embodying a program of instructions executable by the computer to perform a method of systems administration for a computer network, the method comprising the steps of:

(a) creating an object-based representation of the network in a memory of a computer connected to the network, wherein the object-based representation comprises one or more objects linked together in the memory to form a hierarchy, wherein each of the objects represents the network, one or more nodes within the network, or one or more components executed by each of the nodes within the network, and wherein each of the objects stores systems management information about the network, node, or component;

(b) generating command objects that target any of the objects in the hierarchy, wherein the command objects describe a systems administrative request for the associated network, nodes, and components; and (c) transmitting the systems administrative request to the associated network, node, and component when the command object is sent to the targeted object.

36. The program storage device of claim 35, wherein the object-based representation further comprises a session object at an apex of the hierarchy.

37. The program storage device of claim 36, wherein the session object comprises a collection of system objects.

38. The program storage device of claim 37, wherein the system object describes and represents a network.

39. The program storage device of claim 38, wherein the node object describes and represents a node within a network.

40. The program storage device of claim 39, wherein the component object describes and represents a component executing on a node within a network.

41. The program storage device of claim 35, wherein each object is defined to have a set of attributes and relationships with other objects.

42. The program storage device of claim 35, wherein the systems administrative request is selected from a group comprising sign on, sign off, startup, shutdown, status, messages, connections, configurations, controls, and diagnostics.

43. The program storage device of claim 35, further comprising the step of retrieving information from the networks, nodes, and components, and for storing the retrieved information in the objects in the memory of the computer.

44. The program storage device of claim 43, wherein the retrieving step further comprises the step of retrieving information from the networks, nodes, and components in response to the command objects.

45. The program storage device of claim 43, wherein the retrieved information comprises response objects.

46. The program storage device of claim 45, wherein the response objects are transmitted from targeted networks, nodes, and components in response to the command objects.

47. The program storage device of claim 45, wherein the response objects are transmitted from targeted networks, nodes, and components as unsolicited messages.

48. The program storage device of claim 35, wherein effective targets for the command object are all active component objects on all signed-on node objects that are subordinate to one or more network objects that are targets of the command object.

49. The program storage device of claim 35, wherein effective targets for the command object are all active component objects that are subordinate to one or more node objects that are targets of the command object.

50. The program storage device of claim 35, wherein effective targets for the command object are all component objects that are identified with one or more component objects that are targets of the command object.

51. The program storage device of claim 35, wherein the targets of the command objects are identified by one or more attributes selected from a group comprising type, name, and number.

* * * * *